United States Patent [19]

Chandler et al.

[11] 4,105,799
[45] * Aug. 8, 1978

[54] PROCESS FOR THE PRODUCTION OF A CASEIN SUBSTITUTE

[75] Inventors: Keith L. Chandler, Algonquin; Roy G. Hyldon, Crystal Lake; Surinder Kumar, Buffalo Grove; John P. O'Mahony, Crystal Lake, all of Ill.

[73] Assignee: The Quaker Oats Company, Chicago, Ill.

[ * ] Notice: The portion of the term of this patent subsequent to Oct. 14, 1992, has been disclaimed.

[21] Appl. No.: 685,735

[22] Filed: May 13, 1976

[51] Int. Cl.$^2$ ............................ A23J 3/00; A23L 1/36
[52] U.S. Cl. ......................................... 426/44; 426/46; 426/49; 426/52; 426/60; 426/254
[58] Field of Search ...................... 426/18, 254, 44, 46, 426/52, 60, 258, 634, 656, 658, 802, 488; 260/112 G, 123.5

[56] References Cited

U.S. PATENT DOCUMENTS

| | | | |
|---|---|---|---|
| 3,420,811 | 1/1969 | Wieren et al. | 426/656 |
| 3,642,490 | 2/1972 | Hawley et al. | 426/459 |
| 3,912,819 | 10/1975 | Chandler et al. | 426/46 X |
| 3,912,820 | 10/1975 | Chandler et al. | 426/46 X |

Primary Examiner—R. B. Penland
Attorney, Agent, or Firm—Charles J. Hunter

[57] ABSTRACT

A process is disclosed for producing an improved modified plant protein having thermoplastic and forming properties similar to casein and caseinate salts. The process comprises making an aqueous slurry of a carbohydrate containing plant protein material, fermenting the slurry with yeast to generate carbon dioxide, reacting the carbon dioxide with a hydroxide to form a carbonate, adjusting the pH, reacting the carbonate with the protein, admixing the slurry with a peroxide, neutralizing the slurry, removing steam volatile flavor components, drying the neutralized slurry, and then blending the dried modified proteinaceous slurry with an unmodified proteinaceous material. The process produces a product whch is improved in odor, taste and color.

16 Claims, No Drawings

PROCESS FOR THE PRODUCTION OF A CASEIN SUBSTITUTE

BACKGROUND OF THE INVENTION

1. Field of the Invention

This invention relates to a process for producing an improved modified plant protein having thermoplastic and forming properties similar to casein and caseinate salts. The process involves the production of carbon dioxide by a yeast-sugar reaction, the conversion of it to a carbonate, and the reaction of the carbonate with plant protein to produce a reaction product. Peroxide is then added to the reaction product and the peroxide containing reaction product is then neutralized. The reaction product is then heated under a vacuum.

2. Description of the Prior Art

Casein, a milk protein, and its salts are used extensively in the food industry to manufacture fabricated food products. One of the major reasons for the popularity of casein and caseinate salts in fabricated foods is its unique functional properties such as high water solubility and the thermoplastic behavior of caseinate-water mixtures. By thermoplastic behavior, in this context, is meant the ability of a protein dough to flow freely like a liquid upon application of heat and a return to a semi-solid elastic mass upon cooling to ambient temperatures. Unmodified plant proteins generally lack this property and therefore cannot be used as a functional replacement of caseinate salts although the cost considerations favor their use. U.S. Pat. Nos. 3,917,877, 3,917,878, 3,917,879, and 3,930,058 have described processes used to modify plant proteins to simulate the thermoplastic properties of casein or caseinate salts. In all of the processes taught in the above patents, unmodified plant protein was treated with alkali. The alkali treatment of plant protein produces a product having a muddy green color and a strong odor characteristic of hydrogen sulfide. It has been observed that the color, odor and flavor of the alkali treated plant protein is highly objectionable and undesirable.

We have now developed a process by which the flavor and color of alkali-modified plant protein can be improved to yield a protein of highly desirable creamy white color and bland flavor. According to the developed process, the alkali-modified solution of plant protein or a mixture of alkali-modified plant protein and animal protein is reacted with a peroxide solution, followed by removal of steam volatile flavor components. The latter may be accomplished by heating the peroxide treated protein solution under a vacuum and removing the vapors. The relative amount of peroxide added and the time and temperature of peroxide treatment determine the extent of improvement in color, odor and flavor.

SUMMARY OF THE INVENTION

It is an object of this invention to provide a process for producing a proteinaceous mixture with improved odor, taste, and color, having the thermoplastic and binding properties of casein and caseinate salts.

The object of this invention is accomplished by a process for producing a proteinaceous mixture of modified plant protein and unmodified protein, said mixture having properties similar to casein and caseinate salts, said process comprising:

A. making an aqueous slurry of a carbohydrate containing plant protein material, said plant protein material containing at least about 30 percent by weight protein;

B. fermenting the slurry with yeast to generate carbon dioxide;

C. reacting the carbon dioxide with an alkali metal hydroxide or ammoniumn hydroxide to form a carbonate, said hydroxide being added in an amount sufficient to adjust the pH of the carbonate containing slurry to a pH in the range of from about 7.0 to about 10.5;

D. heating the aqueous slurry to react the carbonate with the protein;

E. cooling the slurry to a temperature within the range of from about 50° F. to about 130° F.;

F. adding from about 0.3 percent to about 2.0 percent by weight peroxide to the slurry per pound of protein;

G. mixing the peroxide containing slurry;

H. adjusting the pH of the slurry to a pH in the range of from about 6.0 to about 8.0 by addition thereto of an edible acid or alkali;

I. heating the slurry under a vacuum to remove steam volatile flavor substances;

J. drying the pH adjusted slurry to remove a substantial portion of the water therein; and K. admixing from 1 to 15 parts by weight of the dried pH adjusted slurry with from 1 to 30 parts by weight unmodified proteinaceous material.

The object of this invention is also accomplished by a process for producing a proteinaceous mixture of modified plant protein and unmodified protein, said mixture having properties similar to casein and caseinate salts and having improved odor, taste and color, said process comprising:

A. making an aqueous slurry of a carbohydrate containing plant protein material, said plant protein material containing at least about 30 percent by weight protein;

B. fermenting the slurry with yeast to generate carbon dioxide;

C. reacting the carbon dioxide with an alkali metal hydroxide or ammonium hydroxide to form a carbonate, said hydroxide being added in an amount sufficient to adjust the pH of the carbonate containing slurry to a pH in the range of from about 7.0 to about 10.5;

D. heating the aqueous slurry to react the carbonate with the protein;

E. cooling the slurry to a temperature within the range of from about 50° to about 130° F.;

F. adding from about 0.3 percent to about 2.0 percent by weight peroxide to the slurry per pound of protein;

G. mixing the peroxide containing slurry;

H. adjusting the pH of the slurry to a pH in the range of from about 6.0 to about 8.0 by addition thereto of an edible acid or alkali;

I. heating the slurry under a vacuum to remove steam volatile flavor substances;

J. admixing from 1 to 15 parts by weight of the pH adjusted slurry with from 1 to 30 parts by weight unmodified proteinaceous material.

Preferably, the process includes a cooling step, say down to a range of from about 60° to 130° F., after the heating-reacting step and prior to the pH adjustment of step H.

More preferably, the plant protein material of this invention is a solvent extracted oil seed vegetable protein.

It is also preferable that the aqueous slurry of this invention has a solids contents of about 3 percent to about 18 percent by weight, and a protein content up to about 12 percent by weight.

The preferred hydroxide of this invention is a member selected from the group comprising sodium hydroxide, potassium hydroxide, and ammonium hydroxide.

The preferred peroxide of this invention is a member selected from the group consisting of hydrogen peroxide, sodium peroxide, potassium peroxide, calcium peroxide and magnesium peroxide.

The preferred reaction temperature of this invention is a temperature of from 280° to 370° F in a closed vessel for 2½ to 5 minutes.

One preferred embodiment of this invention is accomplished by a process for producing a proteinaceous mixture of modified plant protein and unmodified protein, said mixture having thermoplastic and forming properties similar to casein and caseinate salts, said process comprising:

A. making an aqueous slurry of a carbohydrate containing plant protein material, said plant protein material containing at least about 30 percent by weight protein, and said slurry containing from about 8 to 15 percent by weight solids;

B. pasteurizing the slurry by raising the temperature to about 290° F. for at least about 6 seconds and then cooling to a temperature below 100° F., preferably below 65° F.;

C. adding to the cooled, pasteurized slurry from 0.1 to 5.0 percent by weight of yeast based on the solids content;

D. allowing the yeast containing slurry to ferment until a substantial portion of the saccharides have been converted thereby forming carbon dioxide, said fermentation being conducted at a temperature of from 33° to 90° F. for a time period of from 4 hours to 96 hours;

E. reacting the carbon dioxide with an alkali metal hydroxide or ammonium hydroxide to form a carbonate, said alkali metal hydroxide or ammonium hydroxide being added in an amount sufficient to adjust the pH of the carbonate containing slurry to from about 7.0 to about 10.5;

F. heating the slurry to a temperature of from 300° to about 360° F. for a time period of from 1 to 10 minutes;

G. cooling the slurry to a temperature in the range of from 50° to about 130° F.;

H. adjusting the pH of the slurry to a pH in the range of from 6.0 to 8.0 by addition thereto of an edible acid or edible alkali;

I. adding from about 0.3 percent to about 2.0 percent by weight peroxide to the slurry per pound of protein;

J. mixing the peroxide containing slurry;

K. heating the slurry under a vacuum to remove steam volatile flavor substances;

L. drying the slurry to remove a substantial portion of the water therein; and

M. admixing from 1 to 15 parts by weight of the pH adjusted and modified slurry with from 1 to 30 parts by weight unmodified proteinaceous material.

DETAILED DESCRIPTION OF THE INVENTION

The first step in this invention requires making an aqueous slurry of a saccharide or polysaccharide containing plant protein material with the plant protein material containing at least about 30 percent by weight protein. Preferably, the protein material is an oil seed, solvent extracted, plant protein such as soy protein isolate or soy protein concentrate. Other proteins, however, such as oat protein, have been found to be highly acceptable for use in this invention. Other oil seed vegetable proteins, solvent extracted to concentrate the protein therein are also acceptable, such as peanut and sesame protein and the other oil seed vegetable proteins. It is preferred that the protein material contain at least about 30 percent by weight protein.

The aqueous slurry is prepared by adding the carbohydrate containing proteinaceous material to water and mixing until a slurry is obtained. Preferably the slurry is prepared by mixing from 3 to 18 percent by weight of the proteinaceous material in water and mixing until a slurry is formed. This preferably gives an overall protein content in the slurry of up to about 12 percent by weight.

The next step in the invention requires fermenting the slurry with yeast to generate carbon dioxide. The fermentation is accomplished by adding carbon dioxide generating yeast to the slurry and reacting it under fermentation conditions to produce carbon dioxide. For use herein, two particular strains of yeast have been found to be highly desirable. The yeasts *Saccharomyces cerevisiae* A.T.C.C. #7752 and *Saccharomyces carlsbergensis* have been found to be highly desirable for use in this invention.

After the yeast has fermented the sugars therein and produced carbon dioxide, the slurry is preferably heated to pasteurize it and kill the yeast. After this is accomplished the slurry is then preferably cooled and an alakli metal hydroxide or ammonium hydroxide is added to form a carbonate being either an alkali metal carbonate or bicarbonate or ammonium carbonate. The addition of the hydroxide is such as to produce a slurry having a pH above 7.0 up to about 10.5.

After the carbon dioxide has been converted into a carbonate the mixture is heated to react the carbonate with the protein. The heating must be sufficient to provide a reaction between the carbonate and the protein but must be below the decomposition temperature of the protein. We have found, for instance, a reaction temperature of 330° F. for a time period of from 160–200 seconds produces an acceptable product. We have found a reaction temperature of from 295° F. to 310° F. for from 3.5 to 5 minutes produces a good product. Other times and temperatures may also be utilized providing the reaction product, when neutralized, has the same properties as is herein attributed to the above described reaction. It is well within the skill of one knowledgeable in the art to prepare these different products with different reactions in order to arrive at an end product, however, optimum conditions are as stated above. In any condition the temperature should be at least above the boiling point of water up to a point at which degradation of the protein material or reaction product occurs. It is preferable that the reaction be conducted in a closed vessel since this enables heating of the aqueous slurry above the boiling point of water. Generally this will raise the pressure to around 90 pounds per square inch but this is acceptable in producing a desirable product.

At this point in the process, it is preferable to cool the reacted mass. This can be accomplished by conventional means to arrive at a temperature of from about 60° F. to 130° F.

The next step in this invention requires the addition of a peroxide to the slurry. The peroxide containing slurry is then thoroughly mixed. The peroxide can be a member selected from the group consisting of hydrogen peroxide, sodium peroxide, potassium peroxide, calcium peroxide and magnesium peroxide. The relative amount of the peroxide added and the time and temperature of peroxide treatment will determine the extent of improvement in color, odor and flavor. It is preferably that from about 0.3 percent to about 2.0 percent by weight peroxide is added per pound of protein. It is also preferable to add the peroxide to the slurry when the slurry is at room temperature.

The next step in this invention requires adjusting the pH of the slurry to a pH in the range of from 6.0 to 8.0 by addition thereto of an edible acid or an edible alkali. It is critical that the pH adjustment produce a pH within the stated range. A much lower pH will cause precipitation of the protein. The neutralization can occur by use of any of the known edible acids which are normally used as food additives. For instance, hydrochloric acid, citric acid, formic acid and acetic acid, are all members of the group of edible food grade acids acceptable for use in this invention. If the pH is to be adjusted from the lower to the higher portion of the range, then an alkali is used for the pH adjustment, such as sodium hydroxide, potassium hydroxide, calcium hydroxide, etc.

After the pH of the slurry has been adjusted and the peroxide has been added, the slurry is heated to remove the steam volatile flavor components. The removal of the steam volatile flavor components can be accomplished much faster if the slurry is heated under a vacuum, in the range of from about 15 inches to about 30 inches and at a temperature sufficient to accomplish boiling. Preferably, the steam volatile flavor components are removed from the slurry by heating the slurry to a temperature of 150° F. under a vacuum of 22 inches. By use herein of the term "steam volatile flavor components" it is intended to mean those substances that have a boiling point lower than that of water and which impart objectionable flavors and odors to the alkali modified protein.

After removal of the steam volatile flavor substances, the slurry is then dried to remove a substantial portion of the water. The moisture content of the final product should be about 15 percent by weight moisture or lower. Drying can occur in any of the common commercial processes such as drum drying, spray drying, or freeze drying, and either process is acceptable for use in this invention.

The final step in this process requires admixing from 1 to 15 parts by weight of the neutralized slurry with from 1 to 30 parts by weight unmodified proteinaceous material. The unmodified proteinaceous material refers to proteinaceous material that is not modified according to the process hereinabove described with relation to modification by alkali metal carbonate treatment. The unmodified proteinaceous material may refer to either plant proteins or animal proteins. In other words, the unmodified proteinaceous material can refer to the oil seed vegetable proteins that are solvent extracted such as soy protein concentrate, soy protein isolate, or it may refer to oat protein, peanut protein, or sesame protein which has been unmodified or it may also refer to meat protein such as meaty materials, or to fish protein such as fish flour or fish meal. In other words, the normally accepted usage of the term "proteinaceous material" is acceptable for admixture herewith to produce an acceptable product.

While it is not desired to be bound by any particular theory covering the operation of this invention, nevertheless, the following postulate is offered in relation to the use of the peroxide.

We believe the alkali treatment induces at least two types of reactions that contribute towards the objectionable flavor, odor and color of the treated slurry. It is believed that one of these reactions involves the alkali metal carbonates acting on the sulfur-containing amino acids in a protein thereby producing a number of low molecular weight sulfur containing compounds such as hydrogen sulfide and thiols. These compounds and others produced through secondary reactions are normally volatile and impart unacceptable flavor and color to the protein. We further believe that the other reaction occurs in the presence of alkali and at elevated temperatures. Under these conditions proteins react with carbohydrates to produce chemical compounds that impart brown color and objectionable flavor. The compounds produced in both reactions are mostly reducing compounds. Since peroxides are potent oxidizing agents, we believe that a reaction between the peroxide and the reducing compounds from the alkali treatment takes place causing oxidation of compounds that are responsible for objectionable flavor and color. The volatile compounds are removed by evaporation under vacuum while the compounds responsible for color are oxidized to colorless compounds by the peroxide.

DESCRIPTION OF THE PREFERRED EMBODIMENTS

This invention may be more fully described, but is not limited by the following examples.

EXAMPLE 1

An aqueous slurry of 8 percent by weight defatted soy flour is prepared by mixing the defatted soy flour in water in the appropriate proportion. The yeast *Saccharomyces cerevisiae* and *Saccharomyces carlsbergensis* are added thereto in a closed vessel and the slurry is fermented for 60 hours at 60° F. Sodium hydroxide is added to the mixture until the pH is 8.0. The mixture is then heated to a temperature of 300° F. in a closed vessel for about 4 minutes, and cooled to ambient temperature. The resulting alkali-modified plant protein solution has a muddy green color and a strong odor characteristic of hydrogen sulfide. Hydrogen peroxide is then added to the material and the contents are mixed for 30 minutes. The pH of the protein solution is then adjusted to 7.0 with 1N hydrochloric acid and the solution is pumped into a single stage vacuum evaporator. The solution is heated at 150° F. under a vacuum of 22 inches, and the resulting vapors are removed. The evaporation is continued until the volume in the evaporator is reduced to approximately half the original volume. The resulting slurry is yellowish-white in color and has a bland taste and odor. The product is then dried in a spray drier until the moisture content thereof is less than 15 percent by weight. The dried slurry resembles a creamy white powder with bland taste and odor. The dried slurry is then admixed with unmodified soy protein concentrate in an amount of 3 parts by weight soy protein concentrate to one part by weight dried slurry and extruded into a fibrous product having properties similar to sodium caseinate.

EXAMPLE 2

A procedure similar to that in Example 1 is used except that the pH of the alkali-modified slurry is adjusted to 7.0 before adding hydrogen peroxide.

EXAMPLE 3

Same as Example 1 except that sodium peroxide is mixed with the alkali-modified protein in place of hydrogen peroxide.

EXAMPLE 4

Same as Example 2 except that sodium peroxide is added in place of hydrogen peroxide.

EXAMPLE 5

Example 1 is repeated with the exception that the hydroxide is potassium hydroxide. Again, an acceptable product is produced.

EXAMPLE 6

Example 1 is repeated except the modified plant protein material is oat protein. Again, an acceptable product is produced.

EXAMPLE 7

Example 5 is repeated with the exception that the modified plant protein material is oat protein. Again, an acceptable product is produced.

EXAMPLE 8

Example 1 is repeated except the modified plant protein material is a mixture of one part by weight oat protein and two parts by weight soy flour. Again, an acceptable caseinate replacement is produced.

EXAMPLE 9

Example 1 is repeated except the modified plant protein material is a mixture of one part by weight sesame protein and three parts by weight soy flour. Again, an acceptable caseinate replacement is produced.

EXAMPLE 10

Example 1 is repeated except the modified plant protein material is a mixture of one part by weight peanut protein and one part by weight soy flour. Again, an acceptable sodium caseinate replacement is produced.

EXAMPLE 11

Example 5 is repeated except the modified plant protein material is a mixture of one part by weight sesame protein and three parts by weight soy flour. Again, an acceptable caseinate replacement is produced.

EXAMPLE 12

Example 5 is repeated except the modified plant protein material is a mixture of one part by weight peanut protein and three parts by weight soy flour. Again, an acceptable caseinate replacement is produced.

EXAMPLE 13

Example 1 is repeated with the exception that the unmodified protein is ground meat. Again, an acceptable product is produced, in which the binding characteristics of sodium caseinate are found.

EXAMPLE 14

Example 5 is repeated with the exception that the unmodified protein is ground meat. Again, an acceptable product is produced.

EXAMPLE 15

Example 6 is repeated except the unmodified protein is ground meat. Again, an acceptable product is produced.

EXAMPLE 16

Example 7 is repeated with the exception that the unmodified protein is ground meat. Again, an acceptable product is produced.

EXAMPLE 17

Example 8 is repeated with the exception that the unmodified protein is ground meat. Again, an acceptable product is produced.

EXAMPLE 18

Example 9 is repeated with the exception that the unmodified protein is ground meat. Again, an acceptable sodium caseinate replacement is produced.

EXAMPLE 19

Example 10 is repeated with the exception that the unmodified protein is ground meat. Again, an acceptable caseinate replacement is produced.

EXAMPLE 20

Example 11 is repeated with the exception that the unmodified protein is ground meat. Again, an acceptable sodium caseinate replacement is produced.

EXAMPLE 21

Example 12 is repeated with the exception that the unmodified protein is ground meat. Again, an acceptable sodium caseinate replacement is produced.

Having fully described this new and unique invention, we claim:

1. A process for producing a proteinaceous mixture of modified plant protein and unmodified protein, said mixture having thermoplastic and forming properties similar to casein and caseinate salts, said process comprising:
   a. making an aqueous slurry of a carbohydrate containing plant protein material containing at least about 30 percent by weight protein, said slurry having a solids content of from about 3 percent to about 18 percent by weight;
   b. fermenting the slurry with yeast to generate carbon dioxide, said fermentation being conducted at a temperature of from 33° to 90° F. for from four hours to ninety-six hours, and said yeast comprising a member selected from the group of yeast *Saccharomyces cerevisiae* and *Saccharomyces carlsbergensis*;
   c. adding an alkali metal hydroxide or ammonium hydroxide to the slurry in amount sufficient to form a carbonate and to make a first pH adjustment of the carbonate containing slurry to a pH within the range from of about 7.0 to about 10.5;
   d. heating the aqueous slurry to react the carbonate with the protein;

e. making a second pH adjustment to the slurry to produce a pH in the range of from 6.0 to 8.0 by addition thereto of an edible acid or edible alkali;

f. admixing the slurry with from about 0.3 percent to about 2.0 percent by weight peroxide per pound of protein in the slurry;

g. heating the slurry to a temperature within the range of from 60° to 150° F. under a vacuum to remove steam volatile flavor substances;

h. drying the slurry to remove a substantial portion of the water therein; and i. admixing from 1 to 15 parts by weight of the dried pH adjusted slurry with from 1 to 30 parts by weight unmodified proteinaceous material.

2. A process for producing a proteinaceous mixture of modified plant protein and unmodified protein, said mixture having thermoplastic and forming properties similar to casein and caseinate salts, said process comprising:

a. making an aqueous slurry of a carbohydrate containing plant protein material, said plant protein material containing at least about 30 percent by weight protein, said slurry having a solids content of from about 3 percent to about 20 percent by weight;

b. pasteurizing the slurry by raising the temperature to about 290° F. for at least about six seconds and then cooling to a temperature below 65° F.;

c. adding to the cooled, pasteurized slurry from 0.1 to 5.0 percent by weight yeast, said yeast comprising a member selected from the group consisting of yeast *Saccharomyces cerevisiae* and *Saccharomyces carlsbergensis*;

d. allowing the yeast containing slurry to ferment until a substantial portion of the saccharides have been converted thereby forming carbon dioxide, said fermenting being conducted at a temperature of from 33° to 90° F. for a time period of from four hours to ninety-six hours;

e. adding an alkali metal hydroxide or ammonium hydroxide to the slurry in an amount sufficient to form a carbonate and to adjust the pH of the carbonate containing slurry to from about 7.0 to about 10.5;

f. heating the slurry to a temperature in the range of from 300° to 360° F. for a time period of from 1 to 10 minutes;

g. cooling the slurry to a temperature of from 50° to 90° F.;

h. adjusting the pH of the slurry to a pH of from 6.0 to 8.0 by addition thereto of an edible acid or edible alkali;

i. adding peroxide to the slurry;

j. mixing the peroxide containing slurry;

k. removing the steam volatile flavor components from the slurry by heating the slurry to a temperature within the range of from 60° to 150° F. under a vacuum;

l. drying the slurry to remove a substantial portion of the water therein; and m. admixing from 1 to 15 parts by weight of the substantially dried slurry with from 1 to 30 parts by weight unmodified proteinaceous material.

3. A process for producing a proteinaceous mixture of modified plant protein and unmodified protein, said mixture having thermoplastic and forming properties similar to casein and caseinate salts, said process comprising:

a. making an aqueous slurry of a carbohydrate containing plant protein material, said plant protein material containing at least about 30 percent by weight protein;

b. fermenting the slurry with yeast to generate carbon dioxide;

c. reacting the carbon dioxide with an alkali metal hydroxide or ammonium hydroxide to form a carbonate, said hydroxide being added in an amount sufficient to adjust the pH of the carbonate containing slurry to a pH in the range of from about 7.0 to about 10.5;

d. heating the aqueous slurry to react the carbonate with the protein;

e. cooling the slurry to a temperature within the range of from about 50° F. to about 130° F.;

f. adding from about 0.3 percent to about 2.0 percent by weight peroxide to the slurry per pound of protein;

g. mixing the peroxide containing slurry;

h. adjusting the pH of the slurry to a pH in the range of from about 6.0 to about 8.0 by addition thereto of an edible acid or alkali;

i. heating the slurry to a temperature within the range of from 60° to 150° F. under a vacuum to remove steam volatile flavor substances;

j. drying the pH adjusted slurry to remove a substantial portion of the water therein; and k. admixing from 1 to 15 parts by weight of the dried slurry with from 1 to 30 parts by weight unmodified proteinaceous material.

4. A process for producing a proteinaceous mixture of unmodified protein and liquid modified plant protein, said mixture having thermoplastic and forming properites similar to casein and caseinate salts, said process comprising:

a. making an aqueous slurry of a carbohydrate containing plant protein material, said plant protein material containing at least about 30 percent by weight protein;

b. fermenting the slurry with yeast to generate carbon dioxide;

c. reacting the carbon dioxide with an alkali metal hydroxide or ammonium hydroxide to form a carbonate, said hydroxide being added in an amount sufficient to adjust the pH of the carbonate containing slurry to a pH in the range of from about 7.0 to about 10.5;

d. heating the aqueous slurry to react the carbonate with the protein;

e. cooling the slurry to a temperature within the range of from about 50° to about 130° F.;

f. adding from about 0.3 percent to about 2.0 percent by weight peroxide to the slurry per pound of protein;

g. mixing the peroxide containing slurry;

h. adjusting the pH of the slurry to a pH in the range of from about 6.0 to about 8.0 by addition thereto of an edible acid or alkali;

i. heating the slurry to a temperature within the range of from 60° to 150° F. under a vacuum to remove steam volatile flavor substances; and j. admixing from 1 to 15 parts by weight of the pH adjusted aqueous slurry with from 1 to 30 parts by weight unmodified proteinaceous material.

5. A process as in claim 1 wherein the steam volatile flavor components are removed from the slurry by heating the slurry to a temperature sufficient to accomplish boiling under a vacuum.

6. A process as in claim 1 wherein the plant protein material is a solvent extracted oil seed vegetable protein.

7. A process as in claim 1 wherein the aqueous slurry has a solids content of from about 3 to 20 percent by weight.

8. A process as in claim 1 wherein the aqueous slurry has a protein content of up to 12 percent by weight.

9. A process as in claim 1 wherein the hydroxide is a member selected from the group sodium hydroxide, potassium hydroxide, and ammonium hydroxide.

10. A process as in claim 1 wherein the heating step of paragraph d, comprises heating the mixture to a temperature of from 260° to 370° F. in a closed vessel for from 2 to 5 minutes.

11. A process as in claim 1 wherein the vegetable protein is defatted soy flour.

12. A process as in claim 1 wherein the plant protein material is oat protein.

13. A process as in claim 1 wherein the peroxide is a member selected from the group consisting of hydrogen peroxide, sodium peroxide, potassium peroxide, calcium peroxide, and magnesium peroxide.

14. A process as in claim 1 wherein from about 0.3 percent to about 1.5 percent by weight peroxide is added to the slurry.

15. A process as in claim 1 wherein the slurry is neutralized immediately after the protein in the slurry is reacted with the carbonate.

16. A process as in claim 3 wherein the yeast is a member selected from the group consisting of yeast *Saccharomyces cerevisiae* and *Saccharomyces carlsbergensis*.

* * * * *